United States Patent [19]

Jassal

[11] 4,197,280
[45] Apr. 8, 1980

[54] WET PROCESS PHOSPHORIC ACID PURIFICATION

[75] Inventor: Avtar S. Jassal, Katonah, N.Y.

[73] Assignee: Stauffer Chemical Company, Westport, Conn.

[21] Appl. No.: 948,113

[22] Filed: Oct. 2, 1978

[51] Int. Cl.$^2$ .............................................. C01B 15/16
[52] U.S. Cl. ................................................. 423/321 S
[58] Field of Search ..................................... 423/321 S

[56] References Cited

U.S. PATENT DOCUMENTS

| | | | |
|---|---|---|---|
| 3,556,739 | 1/1971 | Baniel et al. | 423/321 |
| 3,595,613 | 7/1971 | Klingelhoety | 423/321 |
| 3,607,029 | 9/1971 | Goret et al. | 423/321 S |
| 3,684,439 | 8/1972 | Rose et al. | 423/321 S |
| 3,919,396 | 11/1975 | Toshimitsu et al. | 423/321 |
| 3,920,797 | 11/1975 | Toshimitsu et al. | 423/321 |

FOREIGN PATENT DOCUMENTS

| | | | |
|---|---|---|---|
| 5191894 | 8/1976 | Japan | 423/321 S |
| 1472970 | 5/1977 | United Kingdom. | |
| 1129793 | 10/1978 | United Kingdom | 423/321 S |

*Primary Examiner*—O. R. Vertiz
*Assistant Examiner*—Gregory H. Heller
*Attorney, Agent, or Firm*—Roger S. Benjamin

[57] ABSTRACT

Extraction battery fouling is reduced in the solvent extraction purification of crude phosphoric acid by performing the steps of:

(a) extracting crude phosphoric acid with solvent in a main extraction battery without the addition of sulfuric acid;

(b) acidulating the raffinate from step (a) with at least a precipitate-forming amount of sulfuric acid;

(c) aging the precipitate of step (b) for at least 15 minutes, and separating the precipitate from the acidulated raffinate;

(d) extracting with organic solvent the essentially precipitate-free raffinate of step (c) in a secondary extraction battery.

5 Claims, 1 Drawing Figure

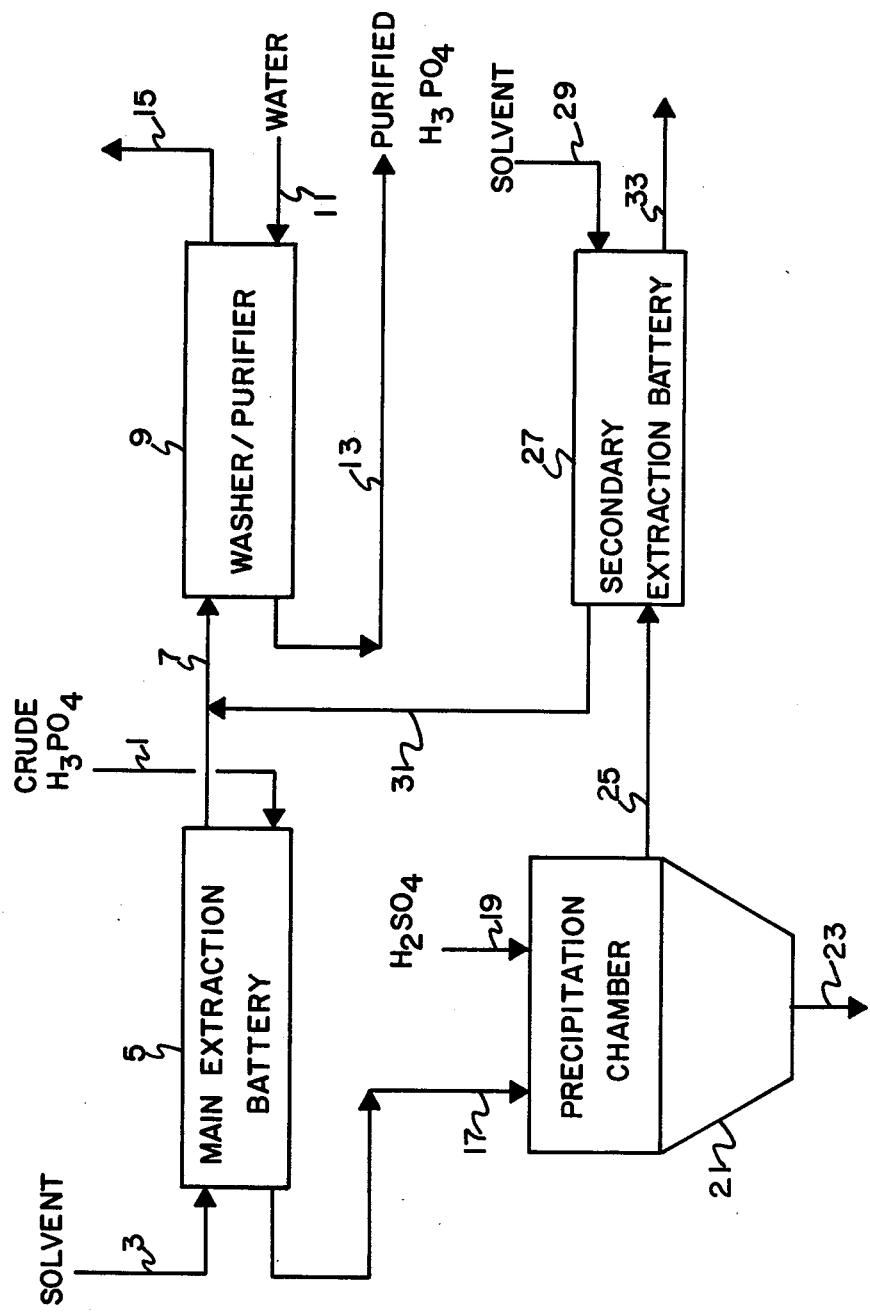

WET PROCESS PHOSPHORIC ACID PURIFICATION

BACKGROUND OF THE INVENTION

Crude wet process phosphoric acid is prepared by the acid digestion of phosphate rock. Commonly, the crude phosphoric acid contains a wide variety of cationic impurities such as calcium, magnesium, aluminum, iron and arsenic. For industrial applications such as food products it is desirable to remove the major portion of these impurities.

It is known to purify phosphoric acid by solvent extraction techniques. In solvent extraction procedures, the crude phosphoric acid is contacted with an organic solvent of limited water miscibility. The organic solvent displays a greater preference for phosphoric acid than it does for the acid contained impurities and effects a selective separation. Unfortunately, it is typical for five to fifteen percent of the potential phosphoric acid ($P_2O_5$) value of the crude acid to be tied-up as metal salts. These salts are not preferentially extracted by the organic solvent.

The conventional method of recovering the phosphoric acid values of crude acid contained metal salts is exemplified by U.S. Pat. Nos. 3,556,739 and 3,595,613. These patents teach that addition of strong acids such as hydrochloric acid or sulfuric acid to the crude acid will promote transfer of additional phosphoric acid values into the organic solvent phase of an extraction system. Hydrochloric acid addition introduces the potential problem of chloride ion removal. Sulfuric acid addition is preferred to the use of hydrochloric acid because of its generally lower cost and greater availability. Nevertheless, sulfuric acid has the attendant disadvantage that it forms precipitates when contacted with the crude phosphoric acid. These precipitated sulfates promote fouling of extraction equipment.

FIELD OF THE INVENTION

Described is a process which is an improvement in the solvent extraction technique for purifying crude phosphoric acid. The process of this invention increases the recovery of phosphoric acid values from crude phosphoric acid feed, minimizes equipment fouling by unwanted precipitation, and enhances the removal of cationic impurities. All of these process advantages are obtainable in a process using sulfuric acid.

DETAILED DESCRIPTION OF THE INVENTION

The general technique of crude phosphoric acid purification by liquid-liquid solvent extraction is well-know and is amply described in U.S. Pat. No. 3,919,396, the disclosure of which is incorporated herein by reference.

The improvements obtained by the practice of this invention are accomplished by modifying conventional solvent extraction procedures with four essential steps.

The first essential step is to extract crude phosphoric acid using conventional organic solvents without supplemental addition of sulfuric acid. The zone in which crude phosphoric acid is initially contacted with organic solvent is hereinafter referred to as the main extraction battery. Sulfuric acid should not be added to the crude phosphoric acid in precipitate-forming amounts either essentially immediately before or during the treatment of the crude acid in the main extraction battery. The prohibition against addition of a precipitate-forming amount of sulfuric acid does not exclude the possibility of limited $H_2SO_4$ addition to the first stage operation. Limited amounts of sulfuric acid may be added if the resultant metal sulfates are produced at concentrations below their respective solubility product constants in the aqueous phosphoric acid phase of the main extraction battery.

The first step restriction on the addition of sulfuric acid eliminates the major source of fouling in the main extraction battery operation. The restriction on sulfuric acid addition also applies to recycle streams combined with the crude phosphoric acid feed to the main extraction battery. For example, a downstream raffinate containing a precipitate-forming amount of sulfuric acid should not be recycled and combined with the crude phosphoric acid feed entering the main extraction battery.

The output streams of the main extraction battery are (1) phosphoric acid enriched organic solvent, and (2) an aqueous raffinate depleted in phosphoric acid and containing the major portion of cationic impurities and phosphate salts.

The phosphoric acid enriched organic solvent stream from the main extraction battery is sent downstream for conventional washing and purification. The aqueous raffinate is sent to the second process step.

The second essential process step is acidulating the raffinate stream from the main extraction battery with at least a precipitate-forming amount of sulfuric acid. The term, "raffinate," refers to the expelled waste stream obtained after the last extractive contact with organic solvent in the main extraction battery. Thus, in performing the second step, sulfuric acid may be fed to the raffinate stream either at some point in the interior of the main battery but after the last extraction stage or at some point further downstream and outside of the main battery.

The quantity of sulfuric acid necessary to constitute a precipitate-forming amount is easily determined by taking an aliquot portion of raffinate and acidifying it with sulfuric acid until a precipitate is observed. Generally, at least 0.1 weight percent $H_2SO_4$ based on the weight of contained phosphorus (as $P_2O_5$) is added to the raffinate. It is preferred practice to acidulate the raffinate with sulfuric acid in amounts considerably above the minimum level required to induce precipitate formation. Higher levels of sulfuric acid addition serve not only to remove undesirable cations by precipitation, but also promote transfer of phosphoric acid values from the aqueous to the organic solvent phase during subsequent solvent extractions of the raffinate. In most instances, sulfuric acid is added at the level of 2 to 50 weight percent based on the weight of phosphorus (as $P_2O_5$) in the raffinate.

The strength of sulfuric acid used for raffinate acidulation is not critical. An acid of low strength will result in unnecessarily diluting the raffinate. Generally, sulfuric acid having an $H_2SO_4$ content of from about 20 weight percent to 98 weight percent is suitable.

The sulfuric acid should be uniformly mixed with the raffinate either at the point of addition or downstream in a separate acidulation/precipitation chamber.

The third essential process step requires aging the precipitate formed by acidulating the raffinate. The precipitate is separated from the raffinate after aging.

It has been discovered that the precipitate formed by sulfuric acid addition to the raffinate becomes more tractable when aged for a period of at least 15 minutes. Preferably, the precipitate aging step is conducted for a period in excess of one hour, although periods over 24 hours show no advantage. Precipitate aging is conducted in the raffinate medium under conditions which avoid high turbulence. For example, the precipitate may be aged in a settling chamber under quiescent conditions or circulated in a loop under conditions of laminar flow.

After the aging operation, the precipitate is separated from the raffinate by any suitable means. Illustrative methods are gravitational settling, filtration, and centrifugation.

A typical sulfuric acid induced raffinate precipitate contains a variety of cations. Although calcium is the predominate cationic constituent, the separation of the precipitate from the raffinate is effective in removing significant amounts of other cations such as aluminum, iron, magnesium, and manganese. Usually, the precipitate from the third step operation represents about 0.1 to 3 weight percent of phosphorus (as $P_2O_5$) content of the raffinate.

At the conclusion of the precipitate separation step, the raffinate has been purified by removal of at least a portion of its cationic impurities. However, the raffinate may still contain phosphoric acid values of about 5 to 15 weight percent tied-up as phosphate salts which were not extracted in the main extraction battery. The fourth process step recovers these residual phosphoric acid values by adding strong acids to the raffinate and extracting it with organic solvent in a secondary extraction battery.

Strong acids suitable for promoting the release of phosphoric acid from phosphate salts include sulfuric acid, hydrochloric acid, and nitric acid. It is a particular advantage of the process of this invention that sulfuric acid may be employed as the strong acid without risk of precipitate fouling. Risk of fouling is removed because the precipitate-forming potential of the raffinate has been exhausted in previous process steps.

There are no critical proportions for the addition of strong acid to the raffinate. Low acid proportions will be ineffective in promoting the release of significant bound phosphoric acid values to the solvent phase. High acid proportions increase phosphoric acid recovery, but this increase is set off by acid cost and subsequent problems associated with removal of the acid anion (e.g., $Cl^-$, $SO_4^{--}$, $NO_3^-$) from the product phosphoric acid. The phosphoric acid releasing effective amount of strong acid is typically between 2 to 50 weight percent based on the weight of phosphorus (measured as $P_2O_5$) in the raffinate. Strong acid as sulfuric acid may be added to the raffinate in the second process step (raffinate acidification) as previously suggested. Alternately, all or part of the strong acid may be added before or during solvent extraction of the acidulated, precipitate-free raffinate in the secondary extraction battery.

The secondary extraction battery is an extraction zone distinct from the main extraction battery and may be physically separate from the main battery or take the form of adjacent cells in a common structure.

The flow of crude acid raffinate from the main extraction battery raffinate must be interrupted by the steps of acidulation, precipitate aging, and precipitate removal before the raffinate may enter as aqueous feed to the secondary extraction battery. However, organic solvent may flow directly from the secondary extraction battery to the first extraction battery provided the solvent has not extracted a precipitate-forming amount of sulfuric acid from the secondary battery. Alternatively, both the primary and secondary batteries may be fed with separate solvent supplies.

The organic solvent used in the main extraction battery may be directly routed to the secondary extraction battery so long as it retains its capacity to selectively extract phosphoric acid. Alternately, fresh solvent or fresh solvent admixed with main battery solvent may provide the solvent for the secondary extraction battery.

The organic solvents used in the main and secondary extraction batteries may be the same or different.

Phosphoric acid extraction is accomplished with organic solvents capable of dissolving phosphoric acid and having a limited miscibility with water. Suitable solvents include alcohols, ketones, amines, aldehydes, and organophosphates. Examples of solvents having utility in this invention are diethyl ether, diisopropyl ether, di-n-butyl ether, ethyl acetate, butyl acetate, amyl acetate, ethyl butyrate, n-butyl alcohol, isobutyl alcohol, amyl alcohol, isoamylalcohol, hexanol, octanol, tricaprylyl amine, and tri-butyl phosphate. Preferred solvents are the $C_{4-8}$ primary, secondary, and tertiary alcohols. Isoamyl alcohol is a particularly preferred solvent for phosphoric acid liquid-liquid extraction. Mixtures of one or more solvents may be used if desired. The organic solvents may be employed in anhydrous form or may contain water or phosphoric acid.

Both the main and secondary extraction batteries may be apparatus conventionally used for such purpose. Particularly suitable apparatus are mixer-settler or column extraction systems having 5 to 20 stages.

The time and temperature of the solvent extraction is not critical to the practice of this invention. Ambient temperatures in the range of 15° C. to 30° C. are generally suitable. Extraction time is a function of the system capacity, number of stages, concentration of crude acid, etc., under control of the process operator, but it is generally in the range of one to twenty-four hours.

The crude phosphoric acid purification may be practiced by the method described below having reference to the FIG.:

Crude wet process phosphoric acid having a $P_2O_5$ content of about 50 weight percent is introduced via line (1) to a ten stage mixer-settler main extraction battery (5). Isoamyl alcohol solvent containing 40 weight % water is introduced into the main battery via line (3). Phosphoric acid enriched solvent exits the main battery via line (7) and is further processed in washer/purifier (9) by acid backwash and extraction with water entering by line (11). A purified phosphoric acid product exits via line (13) and organic solvent stream depleted of phosphoric acid leaves by line (15) for refining and reuse.

The main extraction battery (5) expells a raffinate stream via line (17) which contains a major portion of impurities and phosphate salts.

The raffinate stream is sent via line (17) to precipitation chamber (21) where it is mixed with sulfuric acid entering by line (19) to give an acidulated raffinate. The acidulated raffinate is gently stirred in chamber (21) for ninety minutes whereupon the resultant precipitate is collected in the base of the chamber and removed via line (23). The decanted, acidulated, and precipitate-free raffinate is sent via line (25) to secondary extraction battery (27) for recovery of additional phosphoric acid values. A secondary organic solvent stream (29) contacts the raffinate from stream (25) in 6 stage mixer-settler secondary extraction battery. The phosphoric acid enriched organic solvent stream from the secondary extraction battery leaves by line (31) to be combined with the main extraction battery organic solvent output. Waste stream (33) exiting from the secondary extraction battery is sent out for disposal.

The following Example illustrates the sulfuric acid precipitation step of the process:

EXAMPLE

A nine stage counter current liquid-liquid extraction was carried out on a laboratory scale using a battery of nine 1000 ml. spearating funnels*. The nine funnels were arranged in a row. The extreme righthand funnel was charged with 143 milliliters of 37.8 weight percent crude phosphoric acid. The crude acid was prepared by water dilution of 43.2 weight percent $P_2O_5$ crude acid shown in the Table. The extreme lefthand separatory funnel was charged with 857 milliliters of isoamyl alcohol solvent (containing 3.8 wt. percent water). The separting funnels were shaken for 10 minutes and the phases allowed to separate for 15–30 minutes. After phase separation, the aqueous layer is withdrawn and passed to the funnel on the left, whereas the solvent layer was withdrawn and passed to the funnel on the right. Continued operation in this manner resulted in a 100 grams sample of aqueous raffinate containing 17.3 weight percent $P_2O_5$.

*Method described in *Liquid-Liquid Extraction* by L. Alders, Elsevier Publishing Company, N.Y., 1955, pgs. 115–122.

The aqueous raffinate was acidulated with 4 grams of 98 weight percent sulfuric acid. The resultant precipitate was allowed to settle for thirty minutes. After settling, the precipitate was removed by filtration. Five grams of precipitate was produced. The analysis of the precipitate is shown in the Table below.

TABLE

|  | Crude $H_3PO_4$ Analysis | Precipitate Wet Basis |
|---|---|---|
| $P_2O_5$ | 43.2% | — |
| Calcium | 3900 ppm** | over 10% |
| Aluminum | 9000 ppm | 6000 ppm |
| Magnesium | 5400 ppm | 4600 ppm |
| Manganese | — | 200 ppm |
| Iron | 2000 ppm | 2300 ppm |

**ppm = parts per million by weight

Although the present invention has been described with reference to the specific details of particular embodiments thereof, it is not intended to limit the scope of the invention, except insofar as the specific details are recited in the appended claims.

What is claimed:
1. A process for the liquid-liquid extraction of crude phosphoric acid with organic solvent, which comprises sequentially performing the following steps:
   (a) extracting crude phosphoric acid with organic solvent in a main extraction battery to yield a phosphoric acid enriched solvent phase and a phosphoric acid depleted aqueous raffinate, provided that a precipitate-forming amount of sulfuric acid is not contacted with said crude acid either during or essentially immediately prior to the said main battery solvent extraction;
   (b) acidulating the raffinate from step (a) with at least a precipitate-forming amount of sulfuric acid;
   (c) aging the precipitate of step (b) for at least 15 minutes and thereafter separating the precipitate from the acidulated raffinate;
   (d) extracting with organic solvent the essentially precipitate-free acidulated raffinate of step (c) in a secondary extraction battery.
2. The process of claim 1 wherein the organic solvent is $C_4$ to $C_8$ aliphatic alcohol.
3. The process of claim 2 wherein the organic solvent comprises isoamyl alcohol.
4. The process of claim 1 wherein the raffinate is acidulated with at least 0.1 weight percent sulfuric acid based on the weight of phosphorus (as $P_2O_5$) in the raffinate.
5. The process of claim 1 wherein the precipitate is aged in step (d) for a period of at least one hour.

* * * * *